US005694119A

United States Patent [19]

Ono

[11] Patent Number: 5,694,119

[45] Date of Patent: Dec. 2, 1997

[54] STRUCTURE OF A PAGING RECEIVER AND A MESSAGE DATA STORAGE CONTROL METHOD

[75] Inventor: Hiroshi Ono, Tokyo, Japan

[73] Assignee: NEC Corporation, Tokyo, Japan

[21] Appl. No.: 358,366

[22] Filed: Dec. 19, 1994

[30] Foreign Application Priority Data

Dec. 28, 1993 [JP] Japan .................................... 5-336197

[51] Int. Cl.⁶ ........................................................ H04Q 7/18

[52] U.S. Cl. ................................ 340/825.44; 340/825.52; 340/311.1; 455/38.1; 455/57.1; 379/57; 370/313

[58] Field of Search ......................... 340/825.44, 825.47, 340/825.52, 311.1, 825.69, 825.72; 455/38.1, 57.1; 379/56, 57; 370/310, 313

[56] References Cited

U.S. PATENT DOCUMENTS

| | | | |
|---|---|---|---|
| 4,839,641 | 6/1989 | Mori et al. | 340/825.47 |
| 4,873,519 | 10/1989 | Matai et al. | 340/825.47 X |
| 5,075,684 | 12/1991 | Deluca | 340/825.44 |
| 5,177,477 | 1/1993 | Fennell et al. | 340/825.44 |
| 5,177,478 | 1/1993 | Wagai et al. | 340/825.69 X |
| 5,225,826 | 7/1993 | Deluca et al. | 340/825.47 X |
| 5,374,925 | 12/1994 | Ohkuma | 340/825.44 |
| 5,414,418 | 5/1995 | Andros, Jr. | 340/825.47 X |

FOREIGN PATENT DOCUMENTS

| | | | |
|---|---|---|---|
| 0 493 974 A1 | 7/1992 | European Pat. Off. | 340/825.44 |
| 647446 | 1/1989 | Japan . | |
| 3175827 | 7/1991 | Japan . | |

*Primary Examiner*—Michael Horabik
*Assistant Examiner*—William H. Wilson, Jr.
*Attorney, Agent, or Firm*—Sughrue, Mion, Zinn, Macpeak & Seas, PLLC

[57] ABSTRACT

A paging receiver receives a message data including an overhead and a body data. The paging receiver has a first memory with multiple memory slots for holding the body data from multiple message data, and a second memory for holding information about the current storage methods for memory slots of the first memory. The overhead of the message data specifies a memory slot number for storing the body data, and also specifies a method of storing the body data, which may be storage by replacement of current contents, storage by combination with current contents, etc. A controller of the paging receiver selects the storage method from the second memory if the overhead does not specify the method of storing the body data, but uses the method specified in the overhead when present. The body data of the message data is placed in the specified slot of the first memory using the method selected by the controller.

18 Claims, 6 Drawing Sheets

Configuration of OVERHEAD (0byte, 3bytes or 5bytes)

First byte.........................01h
Second to third byte.....Specifies memory number (30h+31h to 32h+30h)
Example Memory slot number 1 → 30h+31h (01 in ASCII code)
Memory slot number 2 → 30h+32h (02 in ASCII code)
Memory slot number 20 → 32h+30h (20 in ASCII code)
Fourth byte...................01h
Fifth byte.......................Strage method (31h or 32h)
Combination → 31h
Replacement → 32h Configuration of OVERHEAD (0byte, 3bytes or 5bytes)

First byte.......................01h
Second to third byte.....Specifies memory number (30h+31h to 32h+30h)
Example Memory slot number 1 → 30h+31h (01 in ASCII code)
Memory slot number 2 → 30h+32h (02 in ASCII code)
Memory slot number 20 → 32h+30h (20 in ASCII code)
Fourth byte....................01h
Fifth byte......................Strage method (31h or 32h)
Combination → 31h
Replacement → 32h

STRUCTURE OF A PAGING RECEIVER AND A MESSAGE DATA STORAGE CONTROL METHOD

BACKGROUND OF THE INVENTION

The present invention relates to a paging receiver, and especially to controlling the storage method of body data in a newly-received message data.

A prior paging receiver is explained using FIG. 4.

In this figure, 100 is a reception antenna for receiving radio calling signals.

200 is a receiving section for demodulating received signals.

300 is a decoder for decoding demodulated signals and comparing them with the ID numbers of the receiver itself (own ID numbers).

400 is a CPU for controlling received message data.

500 is an EEPROM (Electrically Erasable Programmable Read Only Memory) for storing one or more own ID numbers of the receiver itself.

600 is a display section for displaying received message data.

700 is a RAM for storing received message data.

800 is an EEPROM (Electrically Erasable Programmable Read Only Memory) for storing storage methods of the received message data into the RAM 700 for each ID number.

Next, operations of a paging receiver configured as above are explained.

First of all, radio calling signals received with the reception antenna 100 are demodulated in the receiving section 200, and input to the decoder 300.

Then, the decoder 300 compares them with its own ID numbers. If they coincide, the decoder 300 sends the continuously received message data to the CPU 400.

Next, operation of the CPU 400 is explained using FIG.5, a flow chart.

When storing message data for the receiver into the RAM 700, the CPU 400 selects a storage method based on the ID number of the received message data from among the storage methods stored in the EEPROM 800 (Step 15). Then, the CPU 400, based on the selected storage method, either "additionally" stores the received message data into the RAM 700, or replaces it with pre-stored message data (Step 16 to Step 22).

Here, the meaning of "additionally store" is to shift the read-out order of the message data already stored (i.e.,"pre-stored")in the RAM 700 one by one, and to store the just-received message data so as to enable the operator to read out the latest message data first, as shown in Step 17 to Step 20. At this time, if the RAM 700 is full, the oldest message data is deleted.

That is, "additionally store" is a method for realizing read-out of message data from new to old in RAM 700.

Also "replacement of message data"means that if a new message data of the same ID number as that of pre-stored message data is received, the pre-stored message data of the same ID number is deleted and the latest message data is stored in the RAM 700. The RAM 700 stores not only message data, but also ID numbers thereof, as shown in Step 21 to Step 22.

Next, a paging receiver disclosed in Japanese Utility Model Laid-Open No. 7446 (1989) is explained as another example.

This paging receiver comprises a storing means for storing message data with functional data representing the significance of the message data, and a display means for displaying the message data based on the functional data.

When displaying the message data, this paging receiver displays the significance of the data (represented by the functional data), such as "urgent" or "ordinary"

Another example of a paging receiver is disclosed in the Japanese Patent Laid-Open No.1758274 (1991).

Using ID numbers and function specification numbers that are inserted in the message data, this paging receiver classifies a number of received data to store only the latest message for a group, such as stock information. In this prior paging receiver, data sender (i.e., the "transmission side") cannot specify deletion, replacement combination, or revision of data already stored in the RAM (message data storing section) of the receiver.

This means that control of received data occurs at the receiver (i.e., the "reception side") so unnecessary data may exist in the receiver unless a user of the receiver deletes data or selects the latest data. Such operations are troublesome for the user.

Presently, even a paging receiver that enables to specify to replace received data among the above-mentioned paging receivers also can manage only one data for an own ID number.

SUMMARY OF THE INVENTION

It is an object of the present invention to solve the above-mentioned problems.

Moreover, the other objects of the present invention are to provide a paging receiver enabling to handle message data storage methods in data transmission side.

Furthermore, the other objects of the present invention are to provide a paging receiver enabling to control a plurality of message data with an ID number.

The above objects are achieved by a paging receiver for receiving a message data in which an overhead is inserted, comprising: a first storing means for storing body data of the message data in a memory slot specified by a memory slot number set in the overhead; a second storing means for storing storage methods of the body data for respective memory slots in the first storing means; and a control means for selecting a storage method corresponding to a memory slot number set in the overhead among memory data stored in the second storing means and storing the body data in the first storing means in a selected storage method.

In a paging receiver configured as above, if a transmitter transmits a message data with specification of a memory slot number of the first storing means in the paging receiver, for example the transmitter transmits a message data with specification of memory slot number 1 that means "replacement" stored in the second storing means in the paging receiver, a pre-stored data in the memory slot number 1 is deleted and newly received data is stored in the first storing means.

Described as above, the present invention enables a data transmitter to delete, replace, revise pre-stored data or combine a newly sending data with a specified pre-stored data. Without operations for selecting new data by the receiver's user, it is possible not to exist unnecessary data in the paging receiver, so the user is free from any troublesome operations. Therefore, it becomes possible to reliably send only latest data to the receiver.

In addition, data combination can be conducted freely by a transmitter, so the problem that a long data can not be sent by limitations in the transmission side can be solved because split-transmission of a long data can be possible.

This and other objects, features and advantages of the present invention will become more apparent upon a reading of the following detailed description and drawings.

DESCRIPTION OF THE PREFERRED EMBODIMENT

The embodiments of the present invention are explained below.

Figure 1:
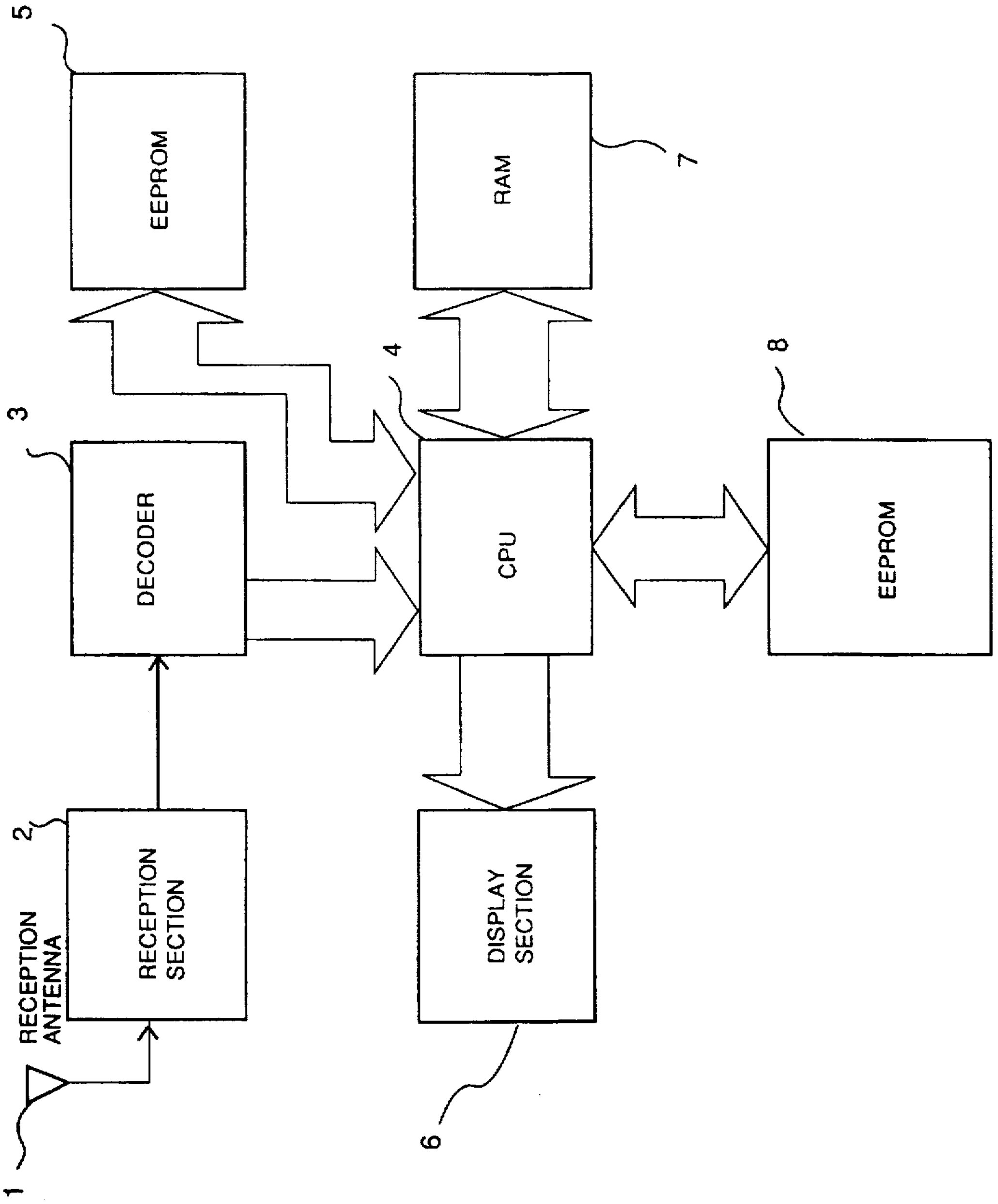
FIG. 1 is a block diagram of an embodiment of the present invention.

FIG. 1 is a block diagram of an embodiment of the present invention.

In this figure, 1 is a reception antenna for receiving radio calling signals.

2 is a receiving section for demodulating received radio calling signals.

3 is a decoder for decoding modulated signals. And it compares decoded data with own ID numbers. For example, it is made of BU61101K produced by NEC Corporation.

4 is a CPU for controlling received message data, it is made of a 4-bit chip of 75X series produced by NEC Corporation.

5 is the first EEPROM (Electrically Erasable Programmable Read Only Memory) for storing one or more own ID numbers.

6 is a display section for displaying body data of received message data.

Figure 6:
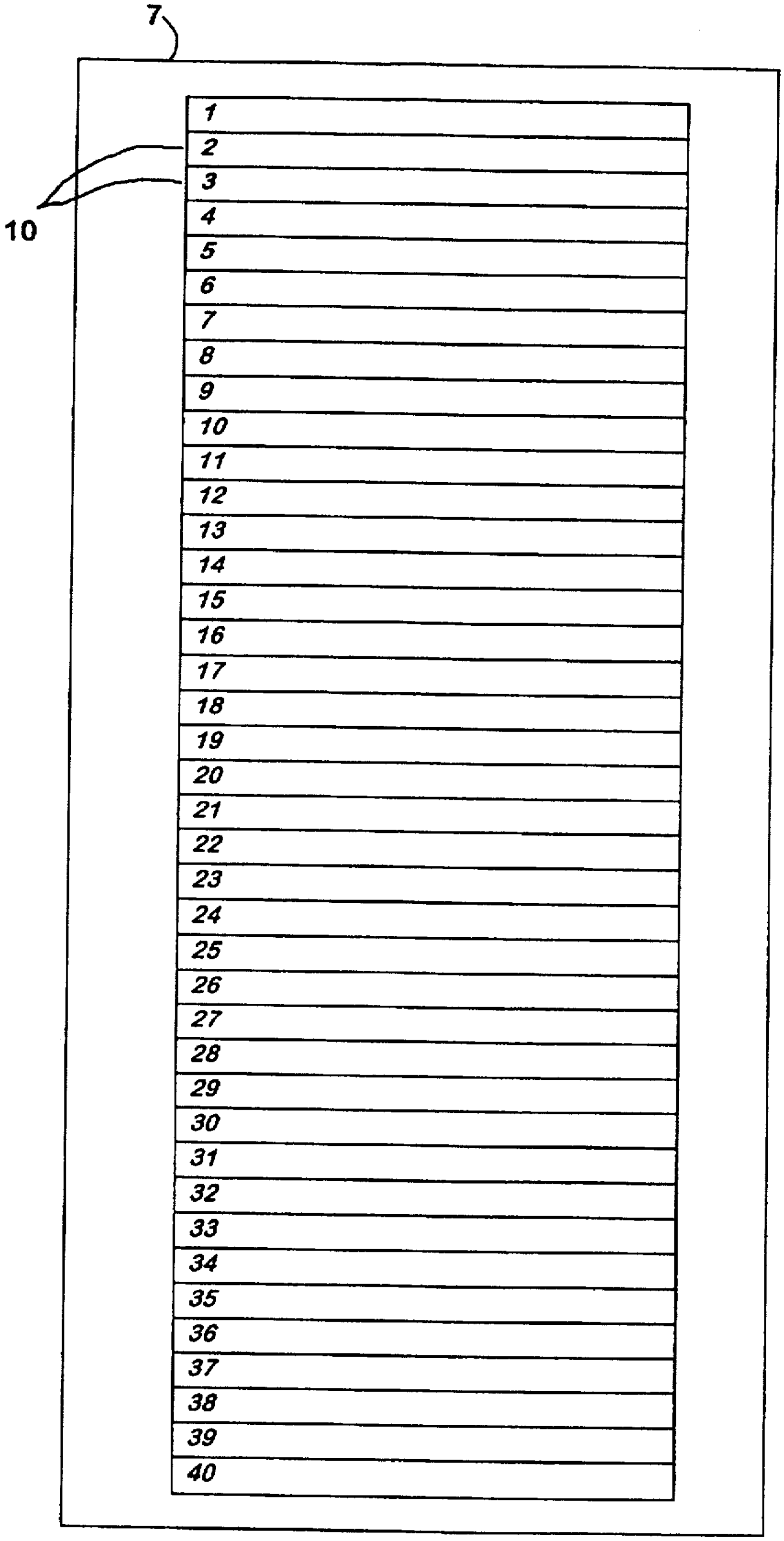
FIG. 6 depicts a RAM with 40 numbered storage slots.

7 is a RAM for storing body data of received message data. As shown in FIG. 6, RAM 7 has plurality of memory slots or storage slots 10. This example shows RAM 7 with 40 numbered storage slots 10. The slots are numbered 1 to 40. In these memory slots, slots of memory slot numbers 1 to 20 are configured so as to conduct memory control by specifying a memory slot number, and slots of memory slot numbers 21 to 40 are configured for storing message data without specification of a memory slot number.

8 is the second EEPROM (Electrically Erasable Programmable Read Only Memory), and is for holding each method of body data into the RAM 7. For each memory slot among memory slots 1 to 20 in the RAM 7, one storage method (e.g., of replacement or combination) is stored in this EEPROM 8.

Here, "replacement" means to delete a body data which has previously been stored (pre-stored) in the RAM 7 and store body data of a latest received message data into the RAM 7. In addition, "combination"means to combine body data of the received latest message data with that of one of pre-stored message data in the RAM 7 and store it in the RAM 7.

Next, a format of message data used in the embodiment of the present invention is explained.

Figure 2:
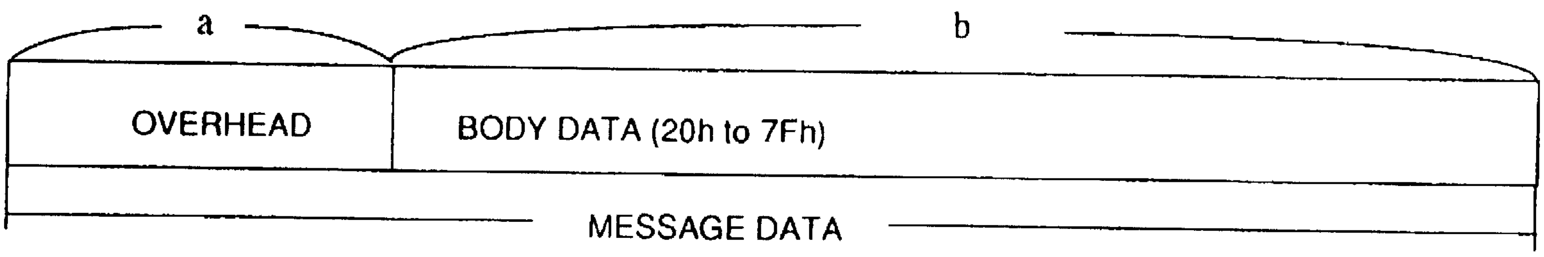
FIG. 2 shows a format of message data of an embodiment of the present invention.

FIG. 2 shows a format of message data of the embodiment.

As shown in FIG. 2, the overhead a is placed ahead of the body data b in this format of this message data.

At the first byte of the overhead a, 01h that represents overhead is set. In the second third bytes, memory slot numbers for storing body data b are set. Setting these memory slot numbers can be conducted as follows. For example, 30h+31h is set if the memory slot number is 1, 30h+32h if the memory slot number is 2 and 32h+30 h if the memory slot number is 20.

In the fourth byte of overhead a, 01h indicates a change of storage method. If the fourth byte is other than 01h, it means that there is no change of storage method and it is interpreted as a first byte of body data.

When the fourth byte is set to 01h, the storage method of body data is set at the fifth byte. For example, 31h indicates the storage method is "combine" and 32h is set if the storage method is "replacement".

Next, the operations of the paging receiver, configured as above, will be explained.

Figure 3:
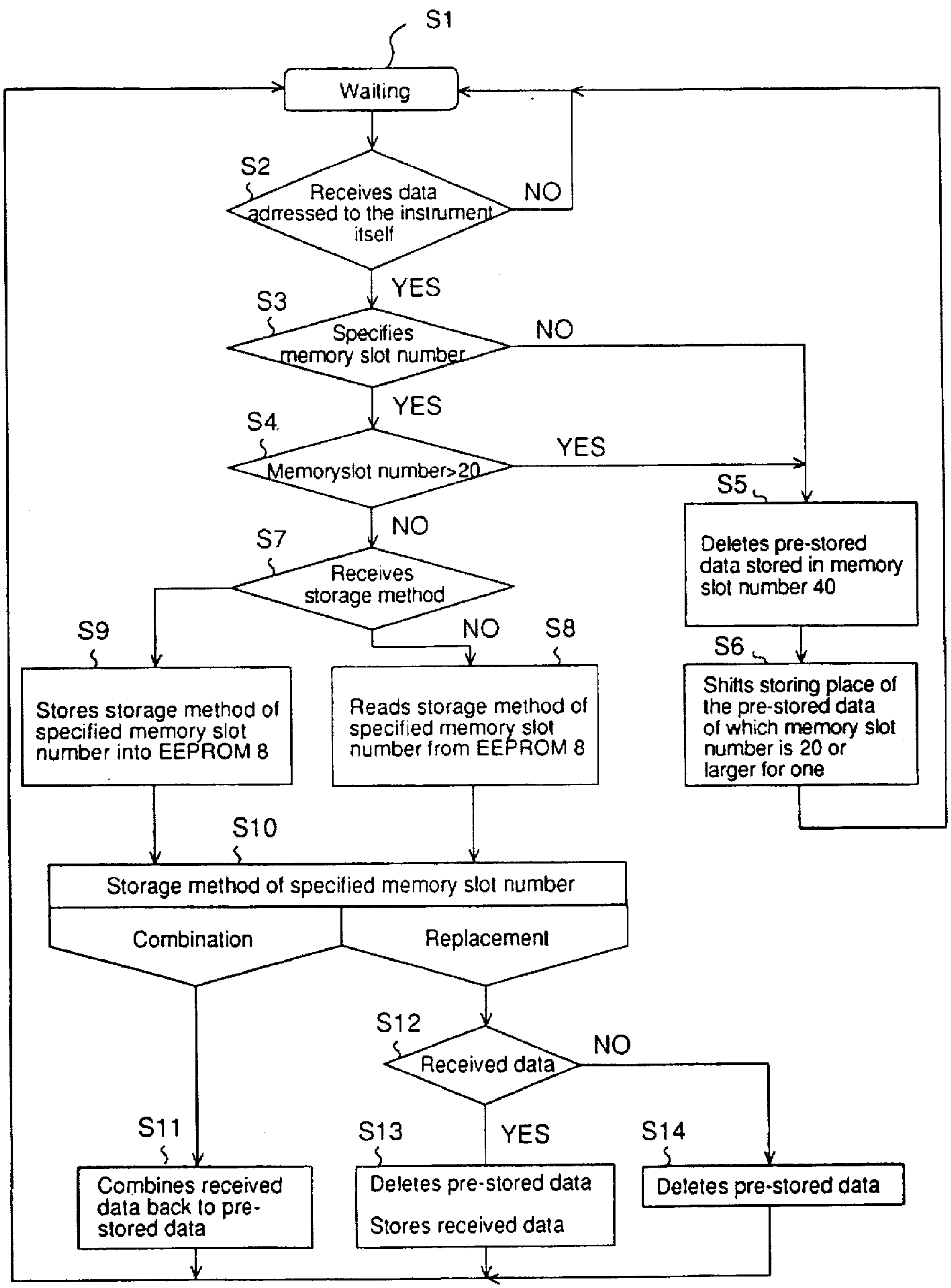
FIG. 3 is a flow chart of an embodiment of the present invention.
Figure 4:
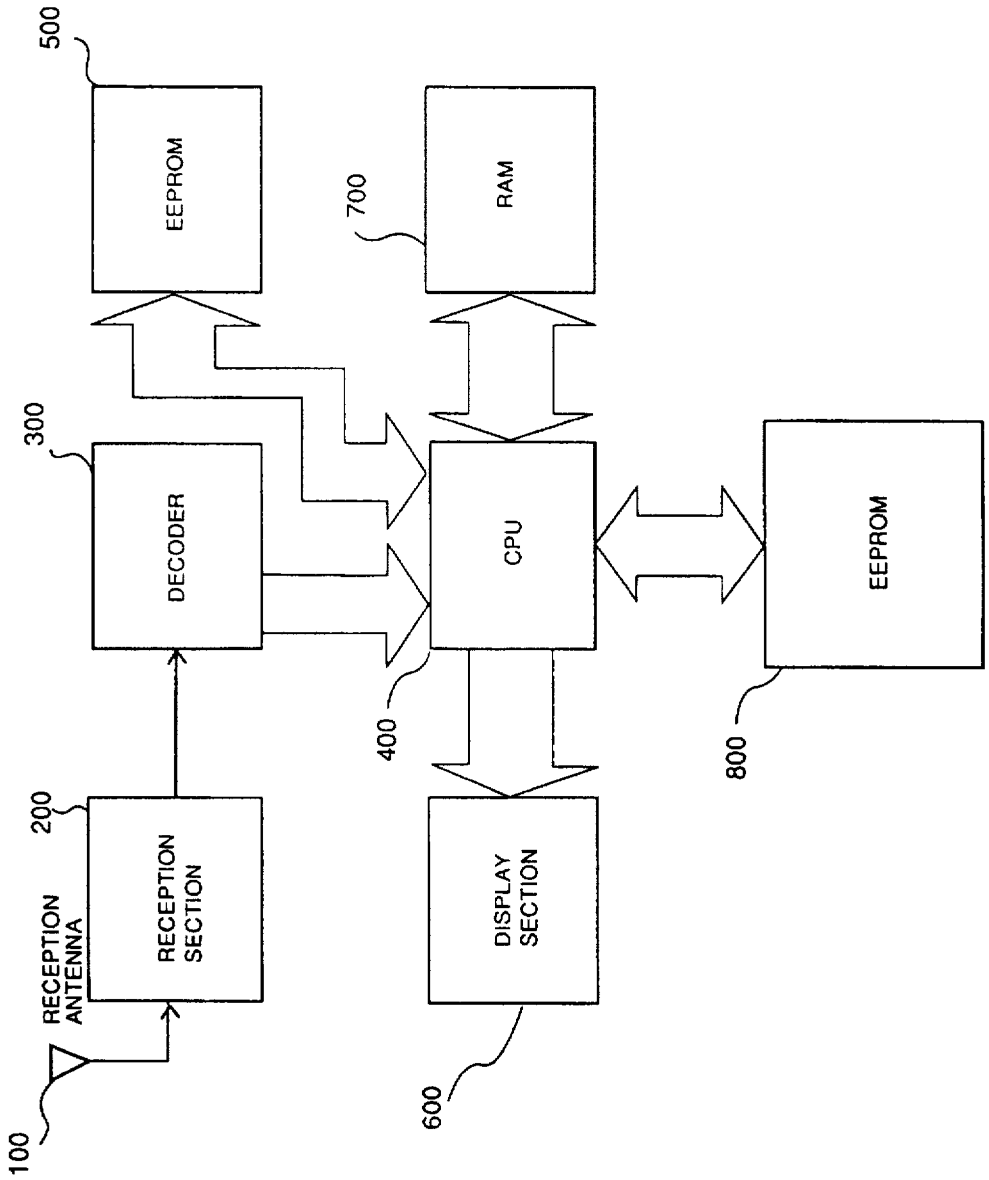
FIG.4 PRIOR ART
FIG. 4 is a block diagram of a prior paging receiver.
Figure 5:
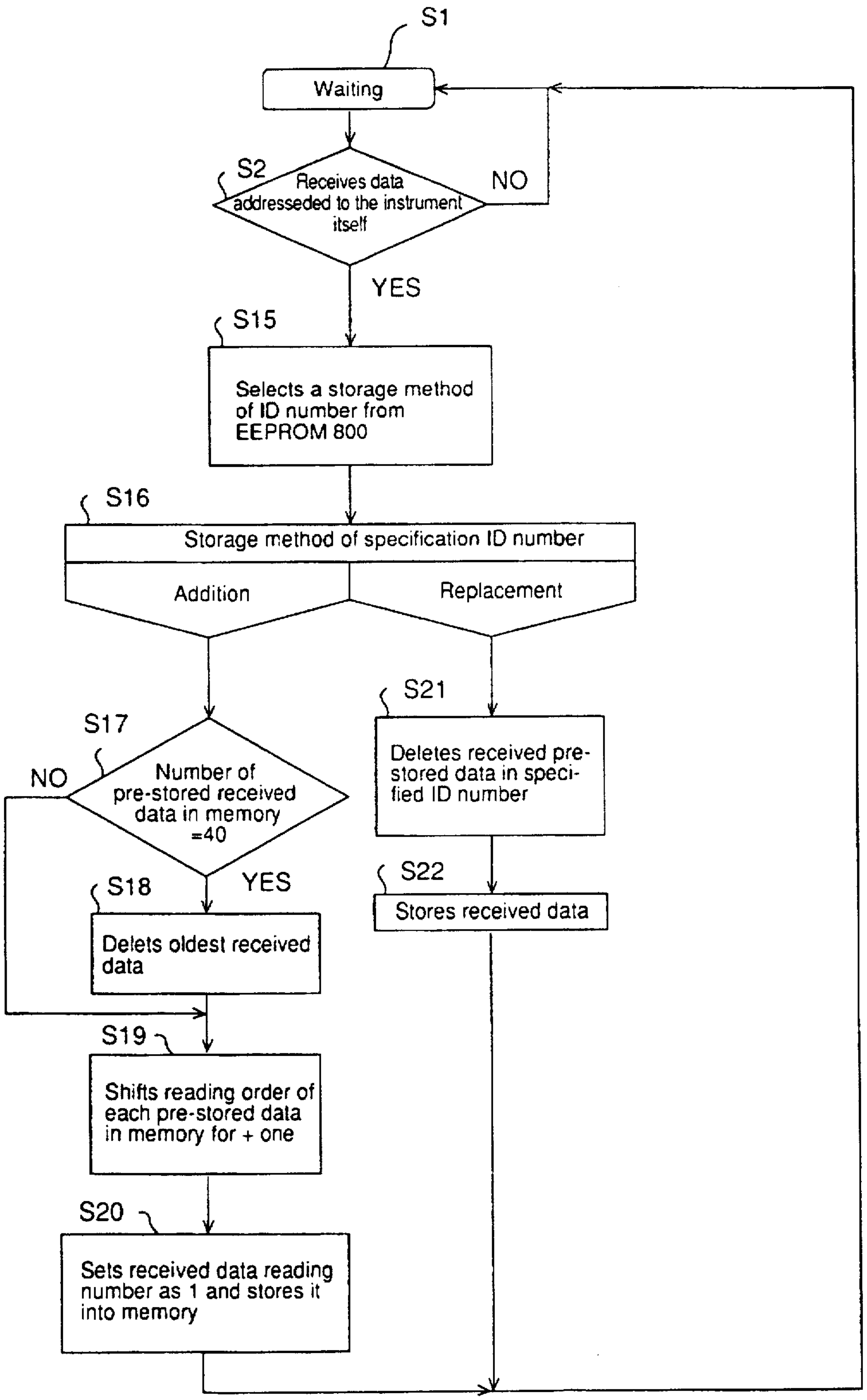
Fig.5 PRIOR ART
FIG. 5 is a flow chart showing a prior storing method of received data into a received data memory.

FIG. 3 is a flow chart showing the operations of an embodiment of the present invention.

First of all, when having received data for the receiver itself (Step 1 and Step 2), the CPU 4 checks whether or not an overhead, that is 01h, is set in the received message data, and also checks whether or not a memory slot number is specified (Step 3 and Step 4).

When no overhead is set, or when a memory slot number of larger than 20 is set (even if overhead is set), the CPU 4 stores the received body data into memory slot number 21 (see FIG. 6) in the RAM 7 and shifts the storage places of body data pre-stored in memory slot numbers 21 to 39 respectively by +1. At this time, the pre-stored body data in memory slot number 40 is deleted (Step 5 and Step 6).

If the memory slot number is 20 or less in Step 4, a checking operation, that checks whether or not a storage method for body data is specified, is conducted (Step 7).

If there is no specification in the overhead as to the storage method, the storage method relating to the specified memory slot number is read out from the EEPROM 8 (Step 8). If the specified memory slot number is 2 and the storage method currently held in EEPROM 8 for memory slot number 2 is "combination", for example, the received body data is combined back to the body data pre-stored in the memory slot number 2 (Step 11).

If there is a specification in the overhead to the storage method, the specified storage method is stored in the EEPROM 8 (Step 9) and the received body data is stored according to the specified storage method.

If the specified memory slot number is 2 and the specified storage method is "replacement", for example, the storage method of the memory slot number 2 stored in the EEPROM 8 is deleted and "replacement" is stored instead. Moreover, the body data of the specified memory slot number is deleted and the received body data is stored (Step 13).

It is to be noted that if there is no body data or there are only spaces, the stored body data is deleted and storage is not conducted (Step 12 and Step 14).

What is claimed is:

1. A paging receiver for receiving a message data in which an overhead is inserted, comprising:

a first storing means for storing body data of said message data in a memory slot specified by a memory slot number set in the overhead;

a second storing means for storing storage methods of said body data for respective memory slots in said first storing means; and a control means for selecting a storage method corresponding to a memory slot number set in said overhead among memory data stored in said second storing means and storing said body data with a selected storage method in said first storing means.

2. The paging receiver of claim 1, wherein said second storing means stores one of storage method of replacement that replaces a pre-stored body data in said first storing means with a newly received body data and combination that combines a pre-stored body data in said first storing means and a newly received body data for each memory slot of said first memory means.

3. The paging receiver of claim 1, wherein when data indicating a storage method of body data is further set in said overhead, said second storing means changes storage method of body data corresponding to a memory slot number set in said overhead to a storage method indicated by said data.

4. The paging receiver of claim 1, wherein when data indicating a storage method of body data is further set in said overhead, said control means instructs said second storing means to change said storage method corresponding to a memory slot number set in said overhead to said storage method indicated by said data, and instructs said first storing means to store said body data with said storage method indicated by said data.

5. The paging receiver of claim 1, wherein said first storing means controls preset memories using memory slot numbers and controls other memories so as to store a latest body data in leading portion by shifting pre-stored body data at each time of storing a body data.

6. The paging receiver of claim 5, wherein said control means judges whether or not a memory slot number is set in said overhead, and if a memory slot number is not set in said overhead said control means makes memories that are not controlled by memory slot numbers in said first storing means store said body data.

7. The paging receiver of claim 1, further comprising:

a third storing means for storing own ID numbers;

a decoder for comparing own ID numbers stored in said third storing means with an ID number of received message data;

a displaying means for displaying body data of said message data.

8. A paging receiver for receiving a message data in which an overhead is inserted, comprising:

a first storing means for storing body data of said message data in a memory slot specified by a memory slot number set in said overhead;

a second storing means for storing storage methods that are one of replacement that replaces a pre-stored body data in said first storing means with a newly received body data and combination that combines a pre-stored body data in said first storing means and a newly received body data for each memory slot of said first storage means, for deleting said storage method that stores a memory slot number set in said overhead, and for newly storing a storage method indicated by said data if said overhead is further set data indicating a storage method of said body data; and a control means for selecting a storage method corresponding to a memory slot number set in said overhead from among storage data stored in said second storing means, instructing said first storing means to store said body data in selected storage method, if said overhead is further set data indicating a storage method of said body data, instructing said second storing means to change said storage method corresponding to a memory slot number in said overhead to a storage method indicated by said data and instructing said first storing means to store said body data in a storage method indicated said data.

9. The paging receiver of claim 8, wherein said first storing means controls preset memories using memory slot numbers and controls other memories so as to store a latest body data in leading portion by shifting pre-stored body data at each time of storing a body data.

10. The paging receiver of claim 8, wherein said control means judges whether or not memory slot numbers are set in said overhead, and if memory slot numbers are not set in said overhead said control means makes memories that are not controlled by memory slot numbers in said first storing means store said body data.

11. The paging receiver of claim 8, further comprising:

a third storing means for storing own ID numbers;

a decoder for comprising own ID numbers stored in said third storing means with an ID number of received message data;

a displaying means for displaying body data of said data.

12. A message data storage control method comprising:

(a) step of modifying message data to provide an overhead adjacent to a body data, wherein said overhead is set memory slot numbers for storing said body data, and transmitting said message data;

(b) step of setting a storage method of said body data for each memory number storing body data of said message data in a reception side; and (c) step of selecting a storage method corresponding to a memory slot number set in said overhead of a received message data from among storage methods indicated by respective memory slot numbers and storing body data of said received message data in a selected storing method.

13. The message data storage control method of claim 12, wherein said (a) step further comprises a step of setting a changing data for indicating change of preset storage method of body data in said overhead which is adjacent to said memory slot number.

14. The message data storage control method of claim 13, wherein said (c) step changes a preset storage method corresponding to said memory slot number to a storage method indicated by said change data and storing said body data in a changed storing method when said change data is set in said over head adjacent memory slot number.

15. The message data storage control method of claim 12, wherein said (b) step sets one of storage method of replacement that replaces a pre-stored body data in said first storing means with a newly received body data and combination that combines a pre-stored body data in said first storing means and a newly received body data for each said memory slot.

16. A system for controlling the storage of newly received messages in a paging receiver, wherein each message conforms to one of a plurality of predetermined formats, said system comprising:

a paging receiver having a first memory comprising numbered storage slots, a second memory having, for each of said numbered storage slots, a corresponding storage method specification, and a controller;

wherein said plurality of predetermined formats comprises a first format such that said message contains respective body data and respective overhead, said respective overhead specifying one of said numbered storage slots; and wherein, when a newly-received one of said messages has said first format, said controller stores said respective body data of said newly-received message in said specified one of said numbered storage slots according to said corresponding storage method specification.

17. The system as set forth in claim 16, wherein:

said plurality of predetermined formats further comprises a second format such that said message contains said respective body data and said respective overhead, said respective overhead specifying (1) said one of said numbered storage slots, and (2) a respective message storage method; and when said newly-received one of said messages has said second format, said controller uses said respective message storage method to update said corresponding storage method specification of said second memory, and then stores said respective body data of said newly-received message in said specified one of said numbered storage slots according to said updated corresponding storage method specification.

18. The system as set forth in claim 17, wherein:

said first memory further comprises non-numbered storage slots;

said plurality of predetermined formats further comprises a third format such that said message contains said respective body data and said respective overhead, said respective overhead being free of a specification as to any of said numbered storage slots; and when said newly-received one of said messages has said third format, said controller stores said respective body data of said newly-received message in one of said non-numbered storage slots.

* * * * *